United States Patent [19]
Tsuneishi et al.

[11] 3,927,493
[45] Dec. 23, 1975

[54] AUTOMOBILE COMPARTMENT DOOR WEATHERSTRIP

[75] Inventors: Norihiro Tsuneishi; Yoshiyuki Miyabayashi, both of Tokyo, Japan

[73] Assignee: Nissan Motor Co., Ltd., Japan

[22] Filed: Jan. 8, 1974

[21] Appl. No.: 431,610

[30] Foreign Application Priority Data
Jan. 9, 1973   Japan.................................. 48-5993

[52] U.S. Cl. ...................... 49/476; 49/485; 49/498
[51] Int. Cl.² ............................................... E06B 7/23
[58] Field of Search ............ 49/476, 485, 489, 498, 49/495; 277/75

[56] References Cited
UNITED STATES PATENTS

| | | |
|---|---|---|
| 2,593,305 | 4/1952 | Hunter .................................. 49/476 |
| 2,603,528 | 7/1952 | Higbie.................................. 49/485 |
| 2,622,286 | 12/1952 | Beck ................................. 49/498 X |
| 2,674,487 | 4/1954 | Wernig .............................. 49/476 X |
| 2,734,239 | 2/1956 | Lombardi .......................... 49/485 X |
| 3,110,065 | 11/1963 | Dennis................................ 49/498 X |

FOREIGN PATENTS OR APPLICATIONS

| | | |
|---|---|---|
| 355,929 | 9/1961 | Switzerland........................... 49/476 |
| 186,141 | 8/1936 | Switzerland........................... 49/476 |

*Primary Examiner*—Philip C. Kannan
*Attorney, Agent, or Firm*—Robert E. Burns; Emmanuel J. Lobato; Bruce L. Adams

[57] ABSTRACT

A weatherstrip having a gutter to collect leaked water and holes to drain the leaked water from the gutter.

2 Claims, 5 Drawing Figures

AUTOMOBILE COMPARTMENT DOOR WEATHERSTRIP

The present invention relates to a weatherstrip for a door of an automobile compartment such as a luggage compartment.

Conventionally, such a weatherstrip is attached to a flange around the compartment door frame and has a tongue to contact an inner panel of the compartment door. Due to the fact that clearances to be sealed by the weatherstrip, as vehicle bodies are assembled in different manufacturing process lines, differ from motor vehicle to motor vehicle, it is very difficult to maintain a good seal satisfactorily. Especially, leaks may occur through areas where the contact force between the tongue and the panel is relatively weak. To maintain good contact force between the tongue of the weatherstrip and the inner panel at all locations around the compartment door frame to provide a good seal, it has been proposed to provide the tongue with a longitudinal cavity. However, even with such an improved weatherstrip, leaks cannot be prevented completely and water may leak into the compartment.

Accordingly one object of the present invention is to provide an improved weatherstrip for a motor vehicle compartment such as a luggage compartment providing effective sealing between the compartment door frame and the mating door.

It is another object of the present invention to provide a weatherstrip which can be installed in existing motor vehicle compartment assemblies without alteration thereto.

The above and the other objects and features of the present invention will be more apparent from the following description, with reference to the accompanying drawings, wherein.

Figure 1:
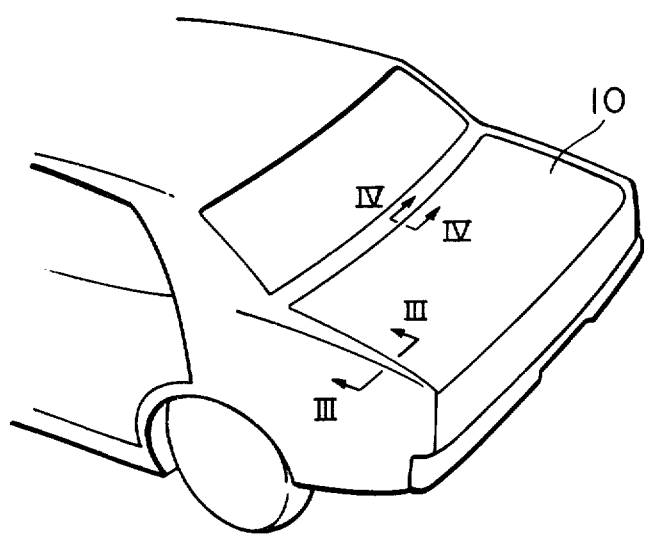
FIG. 1 is a partial perspective view of a passenger car of the type to which the present invention is applicable.
Figure 2:
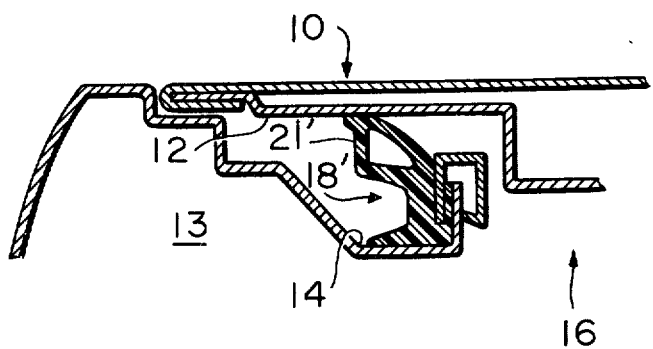
FIG. 2 is a partial sectional view taken along a line III—III of FIG. 1 showing a prior art arrangement when a trunk lid is closed.

A trunk door 10 of a motor vehicle shown in FIG. 1 is formed with an inner panel 12 which faces a flange 14 of a door frame 13 of a luggage compartment 16, the flange 14 being turned upward as shown in FIG. 2.

Figure 3:
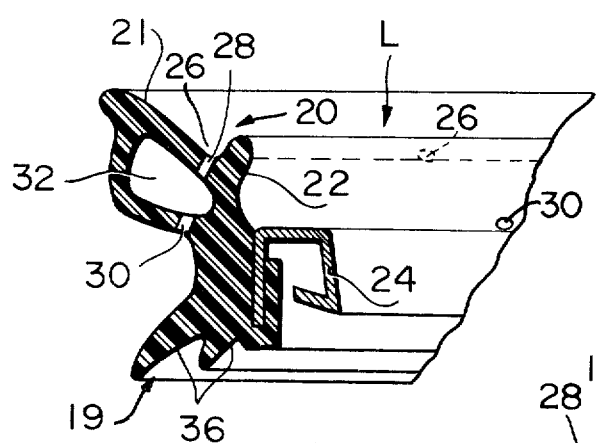
FIG. 3 is a sectional view of a weatherstrip of the invention.
Figure 4:
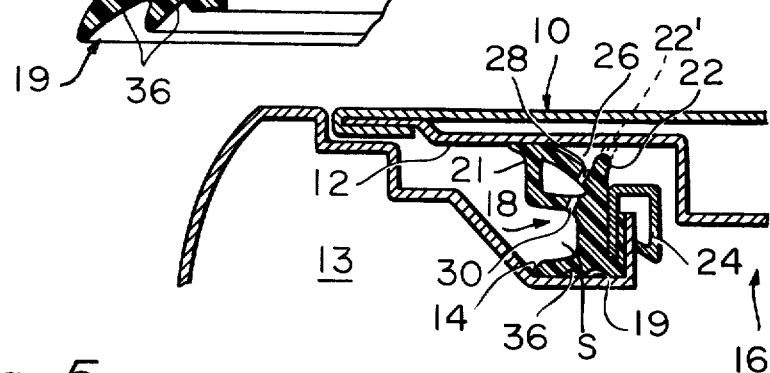
FIG. 4 is a similar view to FIG. 2 showing an arrangement employing the weatherstrip of FIG. 3 when the trunk lid is closed.
Figure 5:
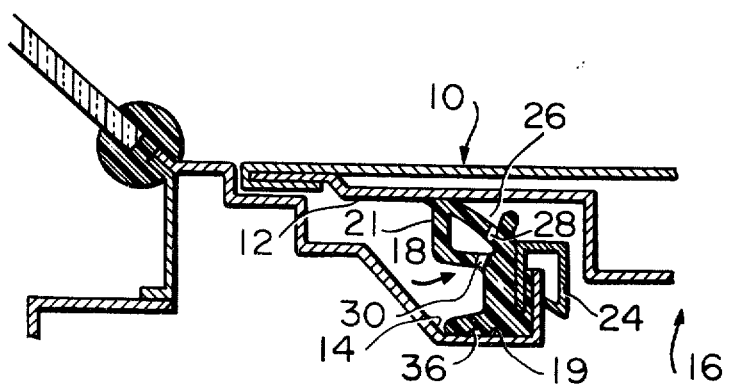
FIG. 5 is a partial sectional view taken along a line IV—IV of FIG. 1 showing a weatherstrip of the invention.

Referring to FIG. 2, there is shown a prior art weatherstrip 18' having a tongue 21', and a hollow cross section. As shown, the tongue 21' contacts the inner panel 12 when the trunk door 10 is closed to effect a seal. The present invention is an improvement over this prior art, and is embodied by a weatherstrip 18 illustrated in FIG. 3 and arranged as shown in FIGS. 4 and 5.

The weatherstrip 18 is in the form of a loop L extending around the entire door frame 13, and has a first surface 19 which is sealingly fixed to the flange 14 by means of a clip 24, and a second surface 20 oriented opposite to the first surface 19. The weatherstrip 18 is hollow having a cavity 32 disposed therein and coextensive therewith. The second surface 20 has a tongue 21 to sealingly contact the inner panel 12 of the door 10 when the door 10 is swung closed to mate with the door frame 13. The tongue 21 extends external of the loop as shown, and a bulge 22 formed on the second surface 20 extends internal of the loop. The tongue 21 and bulge 22 define therebetween a gutter 16. A plurality of passageways are provided having portions 28 connecting the gutter 26 with the cavity 32, and portions 30 connecting the cavity 32 with the exterior of the loop. These passageways 28, 30 thus drain water from the gutter 26 to a location external of the loop L. They intersect the cavity 32. Coextensive grooves 36 are formed in the first surface 19 to constitute a labyrinth seal. The bulge 22 may or may not sealingly contact the inner panel 12, but the sealing effect, especially against dust, will be better if it does, as shown in broken lines 22' in FIG. 4.

When the automobile is exposed to rain, etc., water will enter the space between the inner panel 12 and flange 14 external of the weatherstrip 18 loop. As mentioned before, due to a possible excessive clearance during manufacturing of the automobile, water may leak past the tongue 21 of the weatherstrip 18 into the gutter 26. The water will then drain from the gutter 26 through the passageway portions 28 into the cavity 32, and from the cavity 32 through the passageway portions 30 to a location external of the weatherstrip 18 loop into a lower portion of a space S provided in door frame 13 between the inner panel 12 and flange 14, from where it can be drained external of the automobile by any conventional means. If desired, the passageways may lead directly from the gutter 26 to location S external of the loop independent of the cavity 32, although not shown.

What is claimed is:

1. A weatherstrip for an automotive trunk structure, comprising:
 a loop-shaped body extending in generally horizontal direction when in use, said body having a bottom surface disposed to sealingly fix the body to a flange of a door frame of a trunk, opposite a door for the trunk;
 a tongue extending outwardly-upwardly from the loop-shaped body, integral therewith, and hollow so as to provide a cavity running longitudinally of the body and tongue, for sealingly contacting an inner panel of the trunk door, when in use and when the trunk door is closed; and
 bulge means integral with the body and tongue and extending inwardly-upwardly from the tongue to define therewith, in use, a gutter running longitudinally of the body and cavity, with passageways distributed along the gutter, said passageways extending from said gutter into said cavity and therefrom to the outside of the loop, whereby water gathered in said gutter drains to locations outside of the loop-shaped body.

2. An automotive trunk assembly, comprising:
 structure means for defining a trunk having a flange;
 a swingable lid having an inner panel which faces said flange when the lid is closed; and
 a weatherstrip, comprising; a loop-shaped body extending in generally horizontal direction on the flange, said body having bottom surface means for sealingly fixing it to said flange, opposite said lid; tongue means extending outwardly-upwardly from the loop-shaped body, integral therewith, and hollow so as to provide a cavity running longitudinally of said body and tongue means, for sealingly contacting said inner panel when the trunk lid is closed; and bulge means integral with said body, integral with and extending inwardly-upwardly from said tongue means, for defining therewith, in use, a gutter running longitudinally of said body and cavity, with passageways distributed along said gutter and leading from said gutter through said cavity to the outside of the loop, whereby water gathered in said gutter drains to locations outside of the loop-shaped body.

* * * * *